(12) United States Patent
Constable

(10) Patent No.: US 7,109,717 B2
(45) Date of Patent: Sep. 19, 2006

(54) SYSTEM AND METHOD FOR HYDROCARBON RESERVOIR MONITORING USING CONTROLLED-SOURCE ELECTROMAGNETIC FIELDS

(75) Inventor: Steven C. Constable, San Diego, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 10/538,326

(22) PCT Filed: Dec. 10, 2003

(86) PCT No.: PCT/US03/39309

§ 371 (c)(1),
(2), (4) Date: Jun. 10, 2005

(87) PCT Pub. No.: WO2004/053528

PCT Pub. Date: Jun. 24, 2004

(65) Prior Publication Data

US 2006/0038570 A1    Feb. 23, 2006

Related U.S. Application Data

(60) Provisional application No. 60/432,467, filed on Dec. 10, 2002.

(51) Int. Cl.
*G01V 3/12* (2006.01)

(52) U.S. Cl. ........................................................ 324/337
(58) Field of Classification Search ................ 324/337, 324/334, 338, 347, 354; 175/45; 73/152.02, 73/152.03, 152.05, 152.06; 166/250.02
See application file for complete search history.

(56) References Cited

U.S. PATENT DOCUMENTS 2,293,024 A    8/1942  Klipsch (Continued)

FOREIGN PATENT DOCUMENTS

WO    WO 01/20366 A1    3/2001

(Continued)

OTHER PUBLICATIONS

Paul, A.C., "Evolution of Wireline Well-Logging Technique (The Eye of Oil Industry) in India and Advances Beyond 2000", *Geohorizons*, Jan. 2002.

(Continued)

*Primary Examiner*—Jay M. Patidar
(74) *Attorney, Agent, or Firm*—Eleanor M. Musick; Procopio Cory Hargreaves & Savitch LLP

(57) ABSTRACT

The system and method for real-time monitoring of a hydrocarbon reservoir (4) during extraction include an electro-magnetic source assembly (16) for transmitting a first plurality of electromagnetic fields. A plurality of seafloor antennae (30a–30d) is distributed over an area of the seafloor (8) corresponding to the reservoir (4), where each antenna (30a–30d) comprises recieves electrode array (30a–30d) adapted for receiving a second plurality of electromagnetic fields and generating signals corresponding to the detected fields. A data logging processor receives the signals over time and stores data corresponding to the signals. Different combinations of the receiver electrode are used in combination with transmitter antennae for measuring vertical, radial and/or azimuthal fields. Transmission and detection of the fields can be performed continuously or at timed intervals during hydrocarbon extraction to estimate the rate and efficiency of extraction.

29 Claims, 6 Drawing Sheets

U.S. PATENT DOCUMENTS

| | | | |
|---|---|---|---|
| 2,531,088 | A | 11/1950 | Thompson |
| 2,839,721 | A | 6/1958 | Witte |
| 2,872,638 | A | 2/1959 | Jones |
| 3,052,836 | A | 9/1962 | Postma |
| 3,182,259 | A | 5/1965 | Mayes |
| 4,047,098 | A | 9/1977 | Duroux |
| 4,298,840 | A | 11/1981 | Bischoff et al. |
| 4,617,518 | A | 10/1986 | Srnka |
| 4,634,804 | A * | 1/1987 | Spalding .................. 174/24 |
| 5,770,945 | A | 6/1998 | Constable |
| 6,480,000 | B1 | 11/2002 | Kong et al. |
| 6,603,313 | B1 | 8/2003 | Srnka |
| 2003/0043692 | A1 | 3/2003 | Ellingsrud et al. |
| 2003/0048105 | A1 | 3/2003 | Ellingsrud et al. |
| 2003/0052685 | A1 | 3/2003 | Ellingsrud et al. |
| 2005/0077902 | A1* | 4/2005 | MacGregor et al. ........ 324/334 |
| 2005/0264294 | A1* | 12/2005 | Constable .................. 324/348 |

FOREIGN PATENT DOCUMENTS

| | | |
|---|---|---|
| WO | WO 01/57555 A1 | 8/2001 |
| WO | WO/03/048812 A1 | 6/2003 |

OTHER PUBLICATIONS

Cox, C.S., et al., "Controlled-source electromagnetic sounding of the oceanic lithosphere" (Mar. 6, 1986) *Nature*, vol. 320, No. 6057, pp. 52-54.

Sinha, M.C., et al., "An Active Source Electroagnetic Sounding System for Marine Use" *Marine Geophysical Researches* 12:59-68 (1990).

Constable, S., et al., "Marine controlled-source electromagnetic sounding 2. The PEGASUS experiment" *Journal of Geophysical Research*, vol. 101, No. B3, pp. 5519-5530 (Mar. 10, 1996).

Flosadottir, A.H., et al., "Marine controlled-source electromagnetic sounding 1. Modeling and experimental design" *Journal of Geophysical Research*, vol. 101, No. B3, pp. 5507-5517 (Mar. 19, 1996).

MacGregor, L, et al., "Electrical resistivity structure of the Valu Fa Ridge, Lau Basin, from marine controlled-soiurce electromagnetic sounding", *Geophys. J. Int.* (2001) 146, 217-236.

Eidesmo, T., et al., "Sea Bed Logging (SBL), a new method for remote and direct identification of hydrocarbon filled layers in deepwater areas", *First Break* vol. 20.3 (Mar. 2002), pp. 144-152.

Ellingsrud, S., et al., "Remote sensing of hydrocarbon layers by seabed logging (SBL): Results from a cruise offshore Angola", *The Leading Edge* (Oct. 2002), pp. 972-982.

Everett, Mark E., et al., "Effects ofnear-surface conductance on global satellite induction responses", *Geophysical Journal International*, 15:37 (Mar. 7, 2003), pp. 277-286.

\* cited by examiner

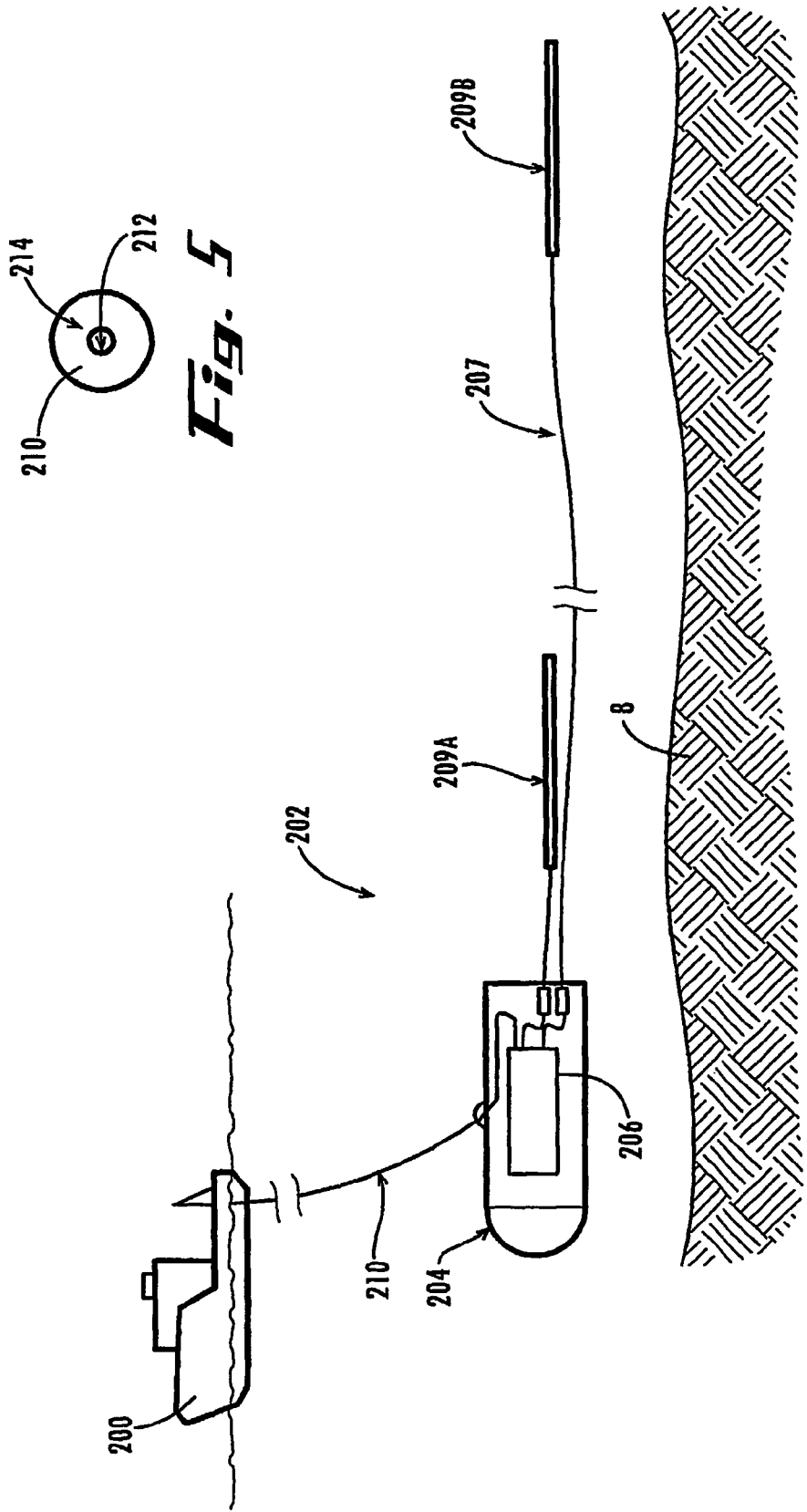

SYSTEM AND METHOD FOR HYDROCARBON RESERVOIR MONITORING USING CONTROLLED-SOURCE ELECTROMAGNETIC FIELDS

RELATED APPLICATIONS

This application claims the priority of U.S. provisional application Ser. No. 60/432,467, filed Dec. 10, 2002, the disclosure of which is incorporated herein by reference in its entirety.

FIELD OF INVENTION

The present invention relates to measurement of the electrical conductivity at the seafloor in a controlled source electromagnetic survey for monitoring sub-seafloor hydrocarbon reservoirs and, more particularly, to a system and method for monitoring sub-seafloor hydrocarbon reservoirs during extraction.

BACKGROUND OF THE INVENTION

Measurement of electrical resistivity beneath the seafloor has assumed an important role in hydrocarbon, e.g., oil or natural gas, exploration and reservoir assessment and development. Seismic methods had traditionally been used for such purposes, however, the results could be ambiguous. Several electromagnetic methods have been developed for mapping sub-seafloor resistivity variations. See, for example, U.S. Pat. No. 5,770,945 of Constable (magnetotelluric methods), U.S. Pat. No. 6,522,146 of Srnka (controlled EM source), International Publication No. WO 03/048812 of MacGregor and Sinha (controlled EM source), and International Publication No. WO 01/57555 of Rees (controlled EM source). The disclosure of each of the identified patent documents is incorporated herein by reference. Controlled EM source (CSEM) methods are well known in the art and have become almost routine for mapping of electrical conductivity of the seafloor in very shallow to deep ocean water, achieving seafloor penetration depths as great as 30 km in 5 km of water. Such methods have provided significant economic savings in terms of avoiding the costs of drilling test wells into sub-seafloor structures that do not contain economically recoverable amounts of hydrocarbon. However, to date, applications of these methods to hydrocarbon reservoirs have been limited to identification and mapping of hydrocarbon-filled layers.

Once it has been located and tapped, it is important to monitor changes in the hydrocarbon reservoir during gas/oil extraction for optimal production. One existing technique involves the drilling of discrete monitoring wells, which, in addition to being expensive and time consuming, are incapable of providing a comprehensive image of reservoir geometry due to the small number of sampling locations. Another technique involves the placement of sensors in the extraction well or "well-logging", in which the drill string is withdrawn, instruments are inserted for measurement then withdrawn, and the drill string is replaced. Other existing methods include repeated, or time lapse, seismic surveys, also known as 4-dimensional seismic modeling. Seismic surveys involve the use of air gun arrays to generate loud seismic pulses at the surface which are reflected by boundaries between the layers of rock and the hydrocarbon reservoir. The seismic method measures acoustic properties of the sub-seafloor structure, which are less well correlated with actual hydrocarbon content than is electrical resistivity. In addition, due to the hazards to those who operate the air gun or are located nearby and the damage to or disturbance of marine life in a wide area around the pulses, continuous or repeated seismic surveying is both undesirable and impractical for extended monitoring applications. Further, borehole seismic surveying involves expensive well downtime.

Accordingly, the need remains for a system and method for economically monitoring a reservoir over time for enhanced recovery of hydrocarbon from the reservoir with minimal damage to the environment from the monitoring technique.

SUMMARY OF THE INVENTION

It is an advantage of the present invention to provide a method for the continuous or repeated mapping of reservoir structure over a large area without the use of expensive wells.

Another advantage of the present invention is to provide a method for generating a comprehensive image of reservoir geometry.

Still another advantage of the present invention is to provide an improved controlled electromagnetic transmitter for use in measurement and monitoring of sub-seafloor hydrocarbon reservoirs.

According to the present invention, time changes in the electrical resistivity of sub-seafloor hydrocarbon reservoirs are monitored using electromagnetic methods involving a controlled electromagnetic source. Changes in estimated reservoir resistivity occur when oil and gas are replaced by water. Both the thickness and lateral extent of the reservoir can be monitored by this method. Such monitoring allows well positions and extraction rates to be optimized for total extraction over the life of the reservoir.

In a first exemplary embodiment, a plurality of conductive cables, each connected to a plurality of receiver electrodes, are distributed over the seafloor around a hydrocarbon production platform so that they extend over the area of the hydrocarbon reservoir. An electromagnetic (EM) transmitter is positioned on the platform and is connected via a separate set of cables to one or more transmitting electrode pairs which are positioned at or near the seafloor. Where multiple electrode pairs are provided, electric currents can be applied either simultaneously or sequentially between pairs of transmitting electrodes, which are positioned to produce vertical, radial and/or azimuthal electric fields. The reservoir depth also governs the distances between transmitting and receiving electrodes, with a general rule that the distance should be at least three times the reservoir depth. Transmission frequencies are determined by the depth of the reservoir and the electrical conductivity of overlying sediments, and are typically 0.25 Hz for 1 km deep reservoirs. Transmission electrodes can be laid horizontally on the seafloor or hung vertically from the platform. Electric fields across the receiver electrodes which result from the EM transmissions are monitored on the production platform. Amplification of the signals from the receiver electrodes can be applied using sub-sea amplifiers or amplifiers located on the platform.

The size and position of the electric fields at the transmission frequencies determines the extent and thickness of the reservoir. The radial electric field mode is most sensitive to the reservoir lateral dimensions. By installing transmitter and receiver electrodes permanently on the seafloor, variations in the amplitude of the received EM signals depend only on changes in the reservoir, and not on relative proximity of other geology that would occur if the electrodes were to be moved.

In a second exemplary embodiment, repeat surveys can be performed using a ship-towed controlled-source EM (CSEM) transmitter which is moved within an array of receiving antennae located on the seafloor. This array can be fixed in place extending over the reservoir, as in the first embodiment, or a plurality of seafloor data loggers, such as the logger disclosed in Pat. No. 5,770,945 or in co-pending International Application No. PCT US03/18522, which is incorporated herein by reference, may be distributed at locations over the reservoir. The data logger units may be deployed by the same vessel that is used to tow the transmitter or may be separately deployed in advance by one or more different vessels or using a crane or other structure located on a fixed platform. Reservoir depth determines transmitter-receiver distances. In this case, the distances between the towed transmitter and the receivers are preferably two times the reservoir depth.

In a first aspect of the present invention, a system is provided for real-time monitoring of a hydrocarbon reservoir over an interval of time during which there may be hydrocarbon extraction. The system includes a controlled source electromagnetic transmitter comprising at least one transmitting antenna for transmitting electromagnetic energy on a plurality occasions over the interval; a plurality of seafloor antennae distributed on the seafloor over an area corresponding to the reservoir, wherein each seafloor antenna comprises a receiver electrode array each providing a signal responsive to energy from the transmitter on each of the occasions; at least one data logging process for receiving on each occasion the signal from each of the antennae, the signal characterizing, in part, impedance of the reservoir, and for causing storage, for each occasion, of at least one parameter related to the signals received from the antennae; a clocking device for associating a time with respect to the at least one parameter stored; and a comparison process for identifying changes over time in the at least one parameter. Each seafloor antenna comprises a plurality of electrodes disposed at pre-determined distances along a conductive cable. The electromagnetic source assembly includes at least one vertical field transmitter for generating vertical electric fields that are measured on all receiver electrodes. Additional transmitters can be positioned for generating radial fields and/or azimuthal fields which are measured by all or selected receiver electrodes.

The transmitter comprises a controlled-source transmitter designed to produce the largest possible current in the waters at the seafloor through the transmitter cable. Because the signal is rapidly attenuated in water, the transmitter electrode array should be positioned close to the seafloor. In applications in which the source is towed by a vessel, it is important that the towed cable array be constructed so that it does not float. It is also preferable that the cable not be so heavy that it will be dragged directly on the seafloor to avoid damage to the cable and/or electrodes as well as to minimize environmental impact, e.g., damage to coral structures or seafloor structures associated with the hydrocarbon production. To achieve this balance, the desired construction for deep-towed cable should be neutrally buoyant. According to existing technology, copper conductors are encased in an oil-filled hose where the density of the oil is selected for neutral buoyancy. Such cables are heavy and difficult to handle and are subject to ruptures which can release the oil into the water and/or allow water to enter the cable. In the preferred embodiment of the present invention, an improved cable for deep-towed applications comprises a stranded aluminum power conductor made neutrally buoyant in seawater by encasing it in a thermoplastic elastomer (TPE) with density less than 1000 kg/m$^3$.

The invention further provides a method for monitoring a sub-seafloor hydrocarbon reservoir over an interval of time during which hydrocarbon extraction may be occurring. The method includes distributing a plurality of receiver antennae on the seafloor over an area corresponding to the reservoir, wherein each antenna comprises a receiver electrode array; deploying at least one electromagnetic field transmitter at or near the seafloor above the reservoir; obtaining, on a plurality of occasions during the interval, from each of the receiver antennae, a signal responsive to energy from the transmitter, each signal characterizing in part impedance of the reservoir; storing, for each occasion, at least one parameter related to signals received from the antennae; and identifying changes over time in the at least one parameter. Sensitivity of the measurements to extraction of hydrocarbon can be controlled by selecting frequency and transmitter-receiver range to produce a ten-fold change in field strength during extraction. Multiple processors may be used and the data combined for measurement over large areas. The clocking device is further used to synchronize between the multiple processors and for stack time. The method for monitoring a hydrocarbon reservoir may be used during extraction and production to evaluate rate of extraction.

BRIEF DESCRIPTION OF THE DRAWINGS

Understanding of the present invention will be facilitated by consideration of the following detailed description of a preferred embodiment of the present invention taken in conjunction with the accompanying drawings, in which like numerals refer to like parts and in which:

FIG. 4 is a diagrammatic view of a towed EM transmitter assembly;

FIG. 5 is a cross-sectional view of the cable for the deep-towed transmitter;

DETAILED DESCRIPTION OF THE PREFERRED EMBODIMENTS

According to the present invention, time changes in the electrical resistivity of sub-seafloor hydrocarbon reservoirs are monitored to determine when oil or gas in the reservoir is replaced by water. Electromagnetic methods involving a controlled electromagnetic source are used. Both the thickness and lateral extent of the reservoir can be monitored by this method by taking measurements either continuously or at timed intervals so that rate of extraction can be determined. Such monitoring allows well positions and extraction rates to be optimized for total extraction over the life of the reservoir.

As is known in the art, hydrocarbon reservoirs may be found under lakes and rivers as well as oceans. Accordingly, for purposes of the description herein, the term "seafloor" is used to refer generally to the bottom of a body of water within which a sufficient level of electrical conduction can occur for measurement, and is not intended to be limited to the ocean bottom.

Figure 1:
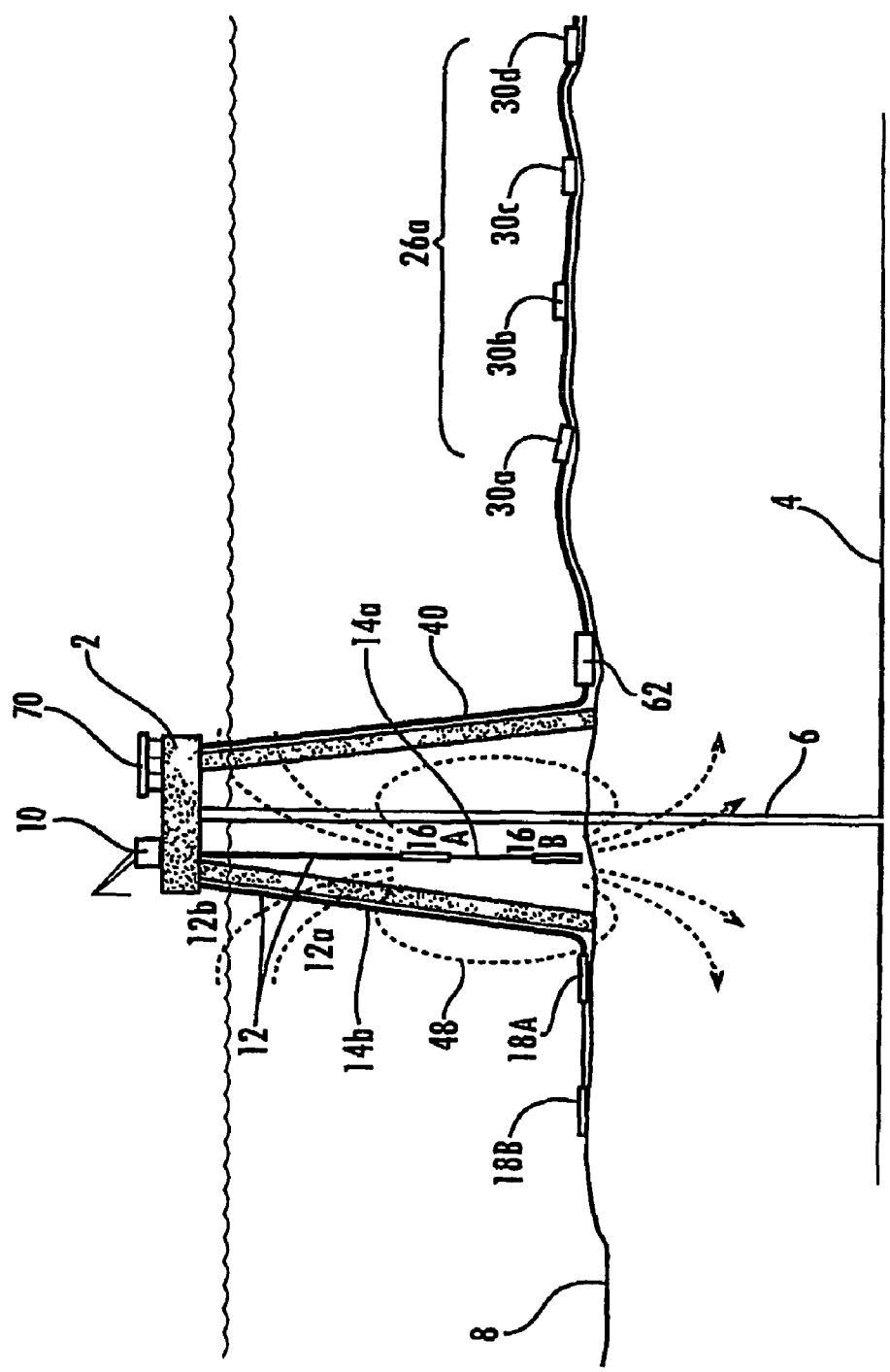
FIG. 1 is a diagrammatic side view of a fixed installation system according to the present invention.
Figure 2:
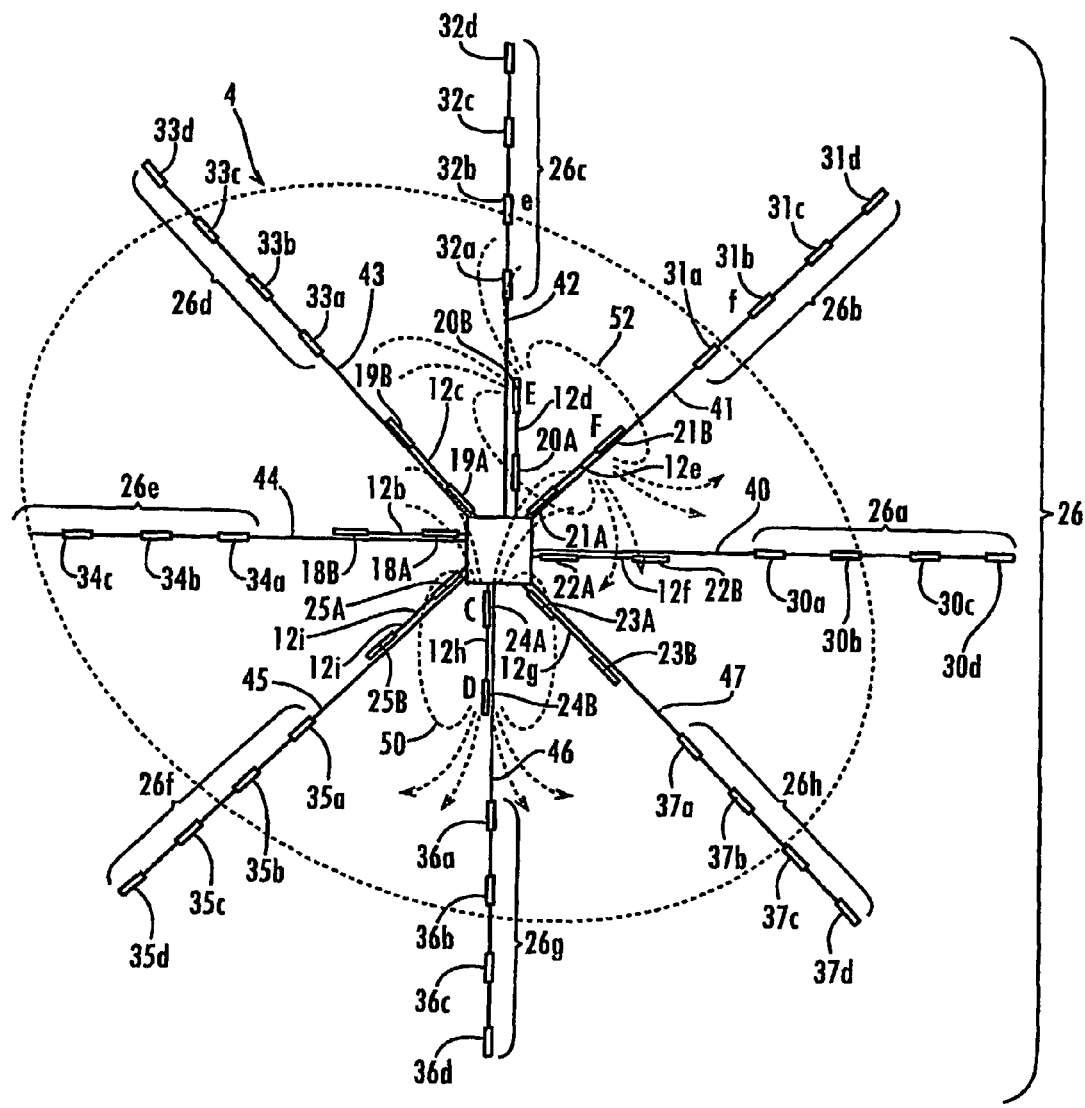
FIG. 2 is a top plan view of a fixed installation system according to the present invention.

The size and position of the electric fields at the transmission frequencies is used to determine the extent and thickness of the reservoir. By installing transmitter and receiver electrodes permanently on the seafloor, variations in the amplitude of the received EM signals depend only on changes in the reservoir, and not on relative proximity of other geology that would occur if the electrodes were to be moved. FIGS. 1 and 2 illustrate a first exemplary embodiment of a system according to the present invention which is mounted in a fixed relationship relative to a platform 2 such as a drilling rig constructed for extracting a hydrocarbon from a sub-seafloor reservoir 4 via drill 6.

An electromagnetic field (EM) transmitter 10 is located on the platform 2, electrically connected to one or more transmitter antennae 12. The transmitter 10 comprises a controlled-source transmitter designed to produce the largest possible current in the waters at the seafloor through the transmitter cable. Because the signal is rapidly attenuated in water, the transmitter electrode array is preferably positioned close to the seafloor within the constraints of transmitter-receiver separation. Where multiple electrode pairs are provided, electric currents can be applied either simultaneously or sequentially between pairs of transmitting electrodes, which are positioned to produce vertical, radial and/or azimuthal electric fields. Transmission frequencies are determined by the depth of the reservoir and the electrical conductivity of overlying sediments, and are typically 0.25 Hz for 1 km deep reservoirs. Transmission electrodes can be laid horizontally on the seafloor or hung vertically from the platform.

In the example illustrated in FIG. 1, antenna 12a is formed from the combination of cable 14a and transmitter electrodes 16A and 16B. In a preferred embodiment, the electrodes are silver-silver chloride electrodes, such as those described in Pat. No. 5,770,945, however, other types of electrodes may be used as will be apparent to those in the art. Antenna 12a, which is suspended from platform 2, generates a vertical electric field, as indicated by field lines 48. Antenna 12b, formed from the combination of cable 14b and transmitter electrodes 16C and 16D, is positioned on the seafloor 8 to generate a radial electric field indicated by field lines 50 in FIG. 2. As an alternative to the platform above the surface of the water, the components can be located in an appropriately sealed housing at or near the seafloor. By installing transmitter and receiver electrodes permanently on the seafloor, variations in the amplitude of the received EM signals depend only on changes in the reservoir, and not on relative proximity of other geology that would occur if the electrodes were to be moved.

An array of receiver antennae 26 are distributed around the seafloor 8 to overlie the area of reservoir 4. The receiver array is connected to a multi-channel amplifier 62 which receives and amplifies the antenna signals for transmission to data logging processor 70 which stores the data collected by the antennae over time. (For purposes of the claimed invention, unless the context otherwise requires, the term "time" refers to at least one of the date or the time of day.) A clocking device, which may be housed within the processor housing and, therefore, is not separately shown in the figure, provides a timing signal to the processor for synchronization for use in signal stacking and phase determination. The clocking device may be any device that is capable of generating an accurate timing signal and may include, for example, a crystal oscillator, an integrated circuit device, a GPS receiver, or some combination thereof. Selection of an appropriate clocking device will be apparent to one of skill in the art.

The stack times are recorded by the processor as references for the stored signal data. The amplifier 62 and data logging processor 70 may be located on the platform 2 or below the surface of the water, protected by a water-tight housing. Referring still to the exemplary embodiment shown in FIG. 1, antenna 26a comprises cable 40 and receiver electrodes 30a–30d. Each receiver electrode pair, e.g., electrodes 30a–30b, and electrodes 30c–30d, comprises one AgCl electrode and one metal electrode. Antenna 26a is only one of many receiver antennae which, as illustrated in FIG. 2, extend radially in a spoke-like arrangement from platform 2 to cover the reservoir 4 (indicated by the dashed line) in enough different directions to provide a reasonable representation of the reservoir's extent. In the illustrated example, the receiver array 26 has eight spokes, specifically, antennae 26a–26h. Antenna 26b comprises cable 41 and receiver electrodes 31a–31d, antenna 26c comprises cable 42 and receiver electrodes 32a–d, antenna 26d comprises cable 43 and receiver electrodes 33a–d. Antenna 26e comprises cable 44 and receiver electrodes 34a–d, antenna 26f comprises cable 45 and receiver electrodes 35a–d. Antenna 26g is made up of cable 46 and receiver electrodes 36a–d and antenna 26h comprises cable 47 and electrodes 37a–d. In general, the distribution pattern of the receiver antennae will depend on the shape of the reservoir and the location of the platform. Thus, the illustrated distribution pattern is intended to be exemplary only.

Although one transmitter will typically be monitored by many receivers, in the exemplary embodiment, for each radial receiver antenna there is a corresponding transmitter antenna for generating the radial EM field to be detected by the receiver antenna. These transmitter antennae can be activated either simultaneously or sequentially. Readings are taken off of the receiver antennae to provide a measurement of the radial extent of the reservoir in a direction corresponding to the radial orientation of the receiver antennae. As illustrated in FIG. 2, when transmitter antenna 12f, which includes electrodes 22A and 22B, is energized, readings are taken from at least receiver antenna 26a (electrodes 30a–d) to provide a radial field measurement corresponding to the radial direction of the antenna. The electric field generated by a transmitter antenna will also be measured at other receiver antennae, and possibly all other receivers in the array, as long as there is sufficient signal strength at the electrodes. Thus, for example, the electric field generated by transmitter antenna 12f would be measured at receiver antennae 26a, 26b, 26c, 26g and 26h. When transmitter antenna 12e (electrodes 21A and 21B) is activated, at least receiver antenna 26b detects the radial field. Similarly, the combinations of transmitter antenna 12d and receiver antenna 26c, transmitter antenna 12c and receiver antenna 26d, transmitter antenna 12b and receiver antenna 26e, transmitter antenna 12i and receiver antenna 26f, transmitter antenna 12h and receiver antenna 26g, and transmitter antenna 12g and receiver antenna 26h can be used to measure the radial fields in their respective directions across reservoir 4.

While it generally does not respond well to variations in resistivity, an azimuthal field is useful as a control signal for providing a measurement of background resistivity. The background resistivity can then be subtracted from the measurements taken using vertical and/or radial fields to provide a background-corrected resistivity measurement. No additional transmitters or receivers are required to measure azimuthal field. Instead, different combinations of the transmitter electrodes and receiver electrodes used for radial measurement can be selected to generate and measure the azimuthal field. For example, referring to FIG. 2, an azimuthal field can be generated across transmitter electrodes 20B and 21B, as indicated by field lines 52, and detected using receiver electrodes 31$b$ and 32$b$, effectively creating an imaginary line or arc that connects points on two different radial spokes. As with the radial field measurement, the electrode combinations can be either simultaneously or sequentially activated to measure the azimuthal field across all sections of the reservoir. For example, the field generated by transmitter electrodes 19B and 20B can be measured using receiver electrodes 32$b$ and 33$b$, then the field generated by transmitter electrodes 18B and 19B would be measured using receiver electrodes 31$b$ and 32$b$, and so on. Thus, using the same transmitter and receiver antenna arrays, reservoir extent and lateral uniformity can be estimated with background resistivity eliminated.

It may be desirable to perform a magnetotelluric (MT) sounding to determine corrections to the CSEM data. The MT data can provide a baseline measurement for sediment conductivity or noise cancellation within the CSEM data. While CSEM methods are very effective at resolving resistive features in the sub-seafloor structure, magnetotellurics (MT) is better at resolving conductive features. The MT method uses measurement of naturally occurring electromagnetic fields to determine the electrical resistivity, or conductivity, of subsurface rocks. There are certain advantages to combining the two techniques to obtain increased accuracy and resolution, particularly in areas of shallow resistive rocks such as basalt.

In one combined application, the MT method can be used as a reference for purposes of noise cancellation from the CSEM data. Specifically, the largest source of noise in the CSEM data below about 0.3 Hz (the exact frequency depends on water depth) is MT signals. Since the MT signals are spatially uniform, it is possible to take time series measurements of magnetic and/or electric fields outside the monitoring array, then use these measurements to subtract MT noise from the monitoring measurements. Applications of this method in a different setting (submarine detection) report up to 40 dB noise reduction.

In another application, MT can be used to improve interpretation of CSEM data. The MT method is preferentially sensitive to conductive parts of the sub-seafloor structure, which in this case, is the sedimentary rocks above and below the reservoir. Because the MT method is almost completely insensitive to thin resistive layers, unless the reservoir is relatively thick and relatively shallow, there will be no response in the MT data. This provides a mechanism to ensure that changes in the CSEM monitoring data are the result of the reservoir depletion and not caused by changes in the sediment conductivity. Repeat measurements of the MT response over the reservoir can be used to monitor sediment conductivity independently of the CSEM monitoring array. Logger units, such as those described in Pat. No. 5,770,945, which include magnetic field induction sensors for use in MT surveys, can be used for both EM and MT measurement. Alternatively, separate detection systems may be used.

Measurement of the vertical field 48, which provides an estimate of the lateral changes in resistivity of the reservoir, i.e., shows the edges, is performed by all receiver electrodes in the antenna array. For example, electrodes 30$a$–30$d$ of receiver antenna 26$a$ can be used to estimate the reservoir thickness at the location corresponding to the area under antenna 26$a$. Similarly, signals from other receiver antennae 26$b$–26$g$ may be read sequentially or in one or more combinations to estimate the reservoir thickness at the location in the reservoir corresponding to the location of the antenna at which the signal is detected.

For dealing with the various combinations of receiver cables and electrodes, a pre-amplifier powered over the cable can be provided for each node of the cable. The amplified signals are then transmitted to the logging processor 70 on the platform. An ADC channel is provided for every cable pair allowing them to be monitored simultaneously. Then, only the transmitter would be switched to generate the different electric fields.

In a second embodiment, repeat surveys can be performed using a ship-towed controlled-source EM transmitter which is moved within an array of receiving antenna located on the seafloor. This array can be fixed in place extending over the reservoir, as in the first embodiment, or a plurality of seafloor data logger units, such as the logger unit disclosed in Pat. No. 5,770,945 or in co-pending International Application No. PCT US03/18522, which is incorporated herein by reference, may be distributed at locations over the reservoir. The data logger units may be deployed by the same vessel that is used to tow the transmitter or may be separately deployed in advance by one or more different vessels or using a crane or other structure located on a fixed platform.

Figure 3:
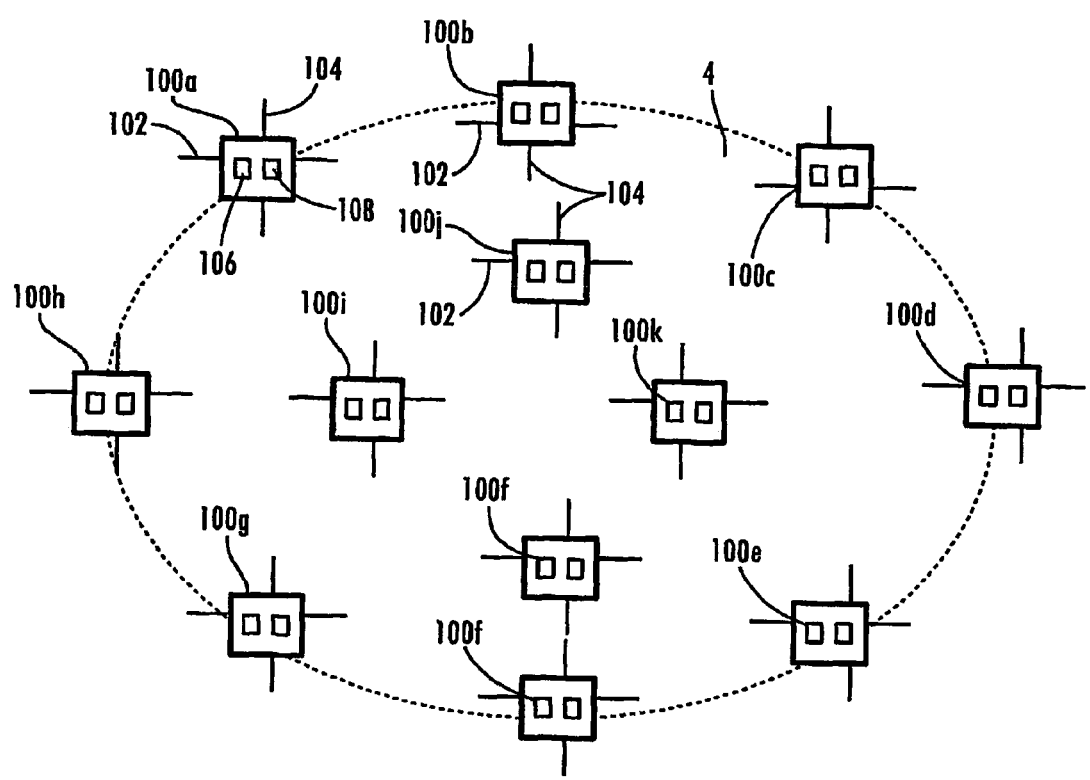
FIG. 3 is a diagrammatic top plan view of an exemplary arrangement of movable logger units deployed at locations on the seafloor according to a second embodiment of the invention.

FIG. 3 illustrates an exemplary arrangement of logger units 100 deployed at locations on the seafloor overlying hydrocarbon reservoir 4. While there are 12 units shown, more or fewer units may be used as long as there is sufficient coverage of the area corresponding to the reservoir to provide a reasonable estimate of its lateral extent. Arrangement of the logger units 100 is not critical as long as there is a reasonable sampling of the reservoir area since it is the tow pattern of the transmitter that allows for radial field measurement. Each logger unit 100, shown diagrammatically, has at least two dipole receiver antennae 102, 104 in an orthogonal relationship, a signal amplifier 106 for receiving and amplifying the signals from the antenna electrodes, and a data logging processor 108, in which the signals are digitized and stored in memory along with a timing signal. Alternatively, appropriate circuitry can be packaged in a water-tight housing located near the receiver electrodes, allowing the electric field signals to be amplified and digitized at the dipole locations, so that a digital signal is transmitted to the central data logger. Other details of the logger unit are disclosed in the above-referenced patent and international application and will not be repeated here. (Additional details of the logger unit are also provided by Constable and Cox ("Marine controlled source electromagnetic sounding 2. The PEGASUS experiment", *J. Geophys. Res.*, 101, pp. 5519–5530, 1996, which is incorporated herein by reference).) Note that vertical field may be measured using an additional vertical dipole antenna, as is disclosed in International application No. PCT US03/18522.

Repeat surveys can be accomplished using a marine controlled-source electromagnetic transmitter 202 towed by a ship 200 or other vessel, as shown in FIG. 4. To provide radial field measurement, the transmitter is towed in a radial pattern over the reservoir area. The distance between the transmitter 202 and the receivers should be two or more times the reservoir depth. Thus, for a 1 km reservoir depth, the receivers should be at least 2 km from the transmitter. In an exemplary embodiment, the transmitter 202 is powered by a shipboard power conditioner that coverts the ship's three-phase power to clean, adjustable amplitude power of appropriate frequency for transmission to the deep-towed transmitter (60 to 400 Hz—the higher frequencies allow the use of more efficient and compact transformers). Alternatively, the shipboard power supply can be a DC source with the signal converted to a high frequency signal in the towed assembly near the seafloor. Frequency control should be precise and stable, preferably using a GPS timebase. The power conditioner may be a DMAC II series power system from Elgar Electronics Corporation (San Diego, Calif.) or similar. A step-up power transformer is used to increase the voltage from the power conditioner to the maximum that the deeptowing cable can tolerate (typically 2000 VAC). A winch and slip-ring assembly are used to transfer high voltage power to the towing cable 210.

The transmitter unit 202, as illustrated in FIG. 4, includes a mechanical tow frame 204 to hold the transmitter electronics 206 and transmission antenna 208. Where the transmitter unit is located on a platform, the tow frame and cable are not required. For a towed transmitter, the transmitter electronics 206 are housed in a pressure resistant, waterproof case. The transmitter antenna 208, with antenna cable 207 and electrodes 209A and B, is connected to the electronics case and towed behind the frame 204.

The transmitter electronics 206 include a step-down power transformer for converting the high voltage power from the deeptow cable 210 to low voltage, high current power for the transmitter 202. The output from the power transformer is full-wave rectified and switched to a lower transmission frequency (10 Hz to 0.01 Hz) using either a silicon controlled rectifier (SCR) bridge and control circuit, as described by Constable and Cox ("Marine controlled source electromagnetic sounding 2. The PEGASUS experiment", *J. Geophys. Res.*, 101, pp. 5519–5530, 1996), or conversion to direct current using a full-wave rectifier bridge of power diodes and the switching of the resulting DC current using integrated gate bipolar transistors (IGBTs).

An electromechanical cable 210 transfers power from the step up transformer into the deeptowed transmitter 202. Because the signal is rapidly attenuated in water, the transmitter antenna 208 should be positioned close to the seafloor, therefore, it is important that the towed cable array be constructed so that it does not float. It is also preferable that the cable not be so heavy that it will be dragged directly on the seafloor to avoid damage to the cable and/or electrodes as well as to minimize environmental impact, e.g., damage to coral structures or to artificial structures associated with the hydrocarbon extraction. To achieve this balance, the desired construction for deep-towed cable 210 should be neutrally buoyant. According to existing technology, copper conductors are encased in an oil-filled hose where the density of the oil is selected for neutral buoyancy. (See, e.g., U.S. Pat. No. 4,634,804.) Such cables can be difficult to handle and are subject to ruptures which can release the oil into the water and allow water to enter the cable. In the preferred embodiment of the present invention, an improved cable for deep-towed applications comprises a metal power conductor made neutrally buoyant in seawater by encasing it in a thermoplastic elastomer (TPE) with density less than 1000 kg/m$^3$. In the preferred embodiment, a stranded aluminum conductor is selected for lightness, however, other metals, including copper, can be used. An exemplary cross-section of the cable 210 is illustrated in FIG. 5, with stranded aluminum conductor 212 encased in TPE 214.

In a third embodiment of the receiver configuration, permanent anchors can be installed at positions across the seafloor over the reservoir area, for example, in a configuration similar to that shown in FIG. 3. These permanent anchors are used to hold a plurality of removable receiver antennae in place. The receiver antennae can be repeatedly placed at the anchor sites using remotely-operated vehicles (ROVs), as are known in the art, just prior to placement of the towed transmitter into the water. Under this embodiment, no electronic equipment needs to be left at the site between measurement operations.

Selection of the optimum transmission frequency maximizes the ability to detect changes in the hydrocarbon reservoir thickness using the resistivity data obtained from electric fields remote from the transmitter. This optimum frequency is determined by the water depth, depth of the reservoir, electrical resistivity of the sediments over the reservoir, and the noise floor of the measuring system. This frequency may be found using computer modeling of a seafloor with layered structure of FIG. 6a, which illustrates a one-dimensional base model of a reservoir 1 km deep in 1 km seawater with 1 ohm-m sediment. (Three dimensional modeling shows that this provides the correct answer if both transmitter and receiver are over the reservoir). There is a tradeoff between temporal resolution and the smallest signal that can be measured. This is related by well-known principles of spectral analysis and signal-to-noise ratio.

The one fixed parameter is the voltage noise floor of the amplifier and electrode system, $V_{Nf}$. The power of the voltage noise floor is about $10^{-18}$ V$^2$/Hz between 0.1 and 10 Hz. This is close to the Johnson (thermal) noise limit of the electrode system, and while this may be improved somewhat, it is unlikely to be changed dramatically. The amplitude of the noise floor ($N_f$) of a controlled source EM system, i.e., the smallest signal that can be measured with a signal to noise ratio of 1, is given by $$N_f = \frac{\sqrt{V_{N_f}/Bw}}{Dm \times L_{RA}},$$

where Bw is the bandwidth of the measurement (the stacking or measurement time), Dm is the dipole moment (in Amp-meters) of the transmitter, and $L_{RA}$ is the receiving antenna length.

Typical values for Dm would be $10^4$ (100 amp transmission into a 100 meter antenna. Note that the current can range from as low as 10 amps up to 1000 amps.) Typical values for $L_{RA}$ would be 100 m for a fixed system and 10 m for a deployed receiver. The noise floor can be improved by increasing the length of both the transmitter and receiver antennas, however, spatial resolution will be reduced.

For a fixed installation according to the first embodiment, transmission can be continuous, with a tradeoff between temporal resolution and noise floor. By stacking measurements over one day, a noise floor of $3 \times 10^{-8}$ V/m/(Am) is obtained. This can be lowered to $1 \times 10^{-18}$ V/m/(Am) with a one-week measurement. By summing measurements over one year, a noise floor of $10^{-19}$ V/m/(Am) can be approached. This probably represents the smallest measurement that can be made in practice.

For a repeat survey using deployed receivers and a ship-towed transmitter as in the second embodiment, bandwidths of a few minutes are possible before the transmitter location has changed significantly. Using 2 minutes and the above typical parameters, one gets a noise floor of $10^{-5}$ V/m/(Am).

Figure 6A:
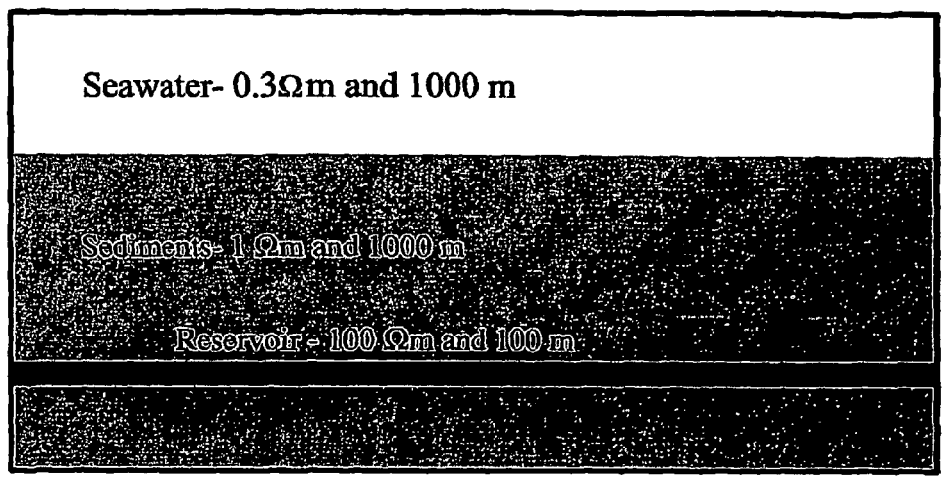
FIG. 6a is a one-dimensional model of a layered structure for measurement.
Figure 6B:
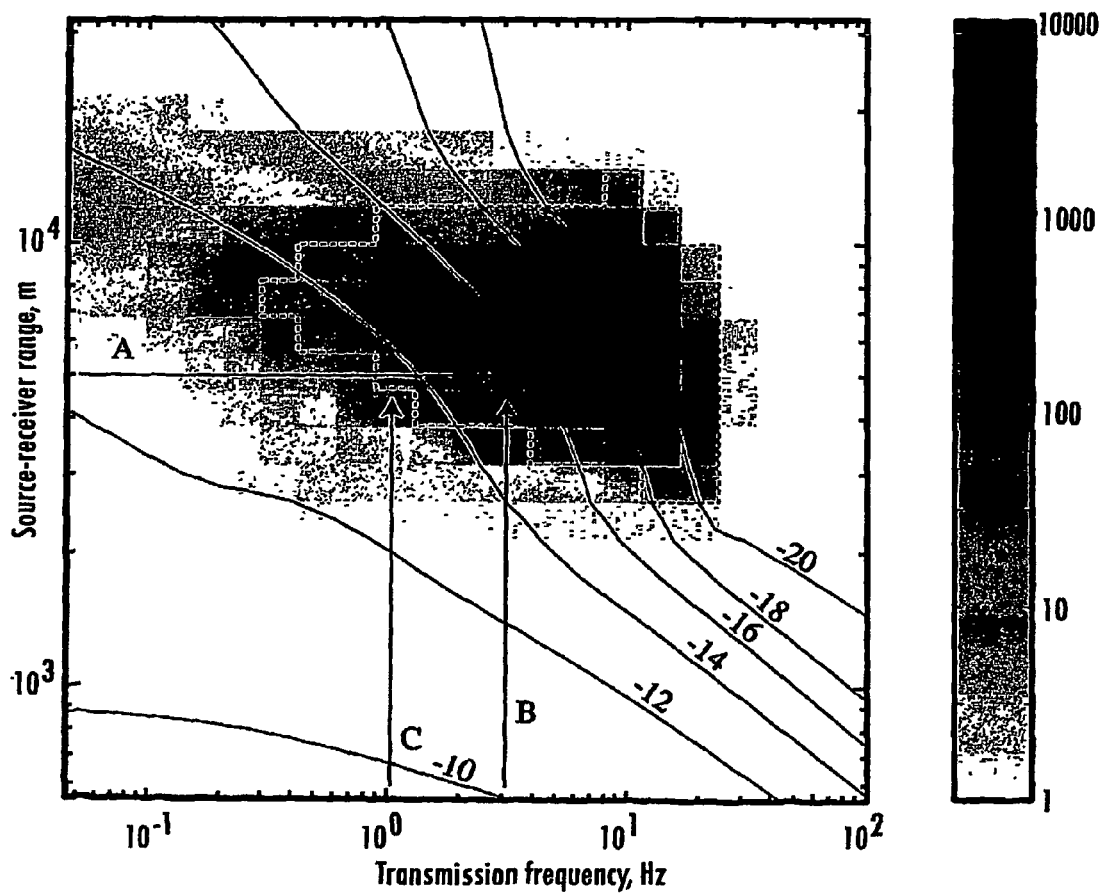
FIG. 6b is a sensitivity plot of source-receiver range with transmission frequency.

FIG. 6b is a grayscale pixelplot illustrating sensitivity using the ratio of the horizontal, radial electric fields with the reservoir in the model shown in FIG. 6a to the electric fields for a fully depleted reservoir and the base model. The greyscale key to the right of the plot indicates the amplitude of the noise floor $N_f$.

The contour lines in FIG. 6b show the magnitude of the electric field with the reservoir present, in exponent form. That is, −20 is $10^{-20}$ V/m per dipole moment. First, one chooses a source-receiver range. This should be made as large as possible, but is limited by the reservoir size and the resolution desired. Here, 5 km (indicated by arrow "A") is selected. For this range, the maximum effect is at 10 Hz, where the signals due to the reservoir are 10,000 times larger than without (indicated by the white diamond within the plot.) However, the signal magnitude is $10^{-19}$ V/m/(Am) with the reservoir and $10^{-23}$ V/m/(Am) without, which is probably too small to measure. However, if the noise floor of the system is $10^{-16}$ V/m/(Am) to $10^{-19}$ V/m/(Am), then a frequency of 3 Hz will be optimal, yielding a thousand-fold change in signal as the reservoir depletes (indicated by arrow "B"). If the noise floor of the system is $10^{-15}$ V/m/(Am) to $10^{-16}$ V/m/(Am), then a frequency of 1 Hz will produce a 10-fold change in field strength (indicated by arrow "C"). The dashed lines in FIG. 6b encompass the 10-fold and higher changes indicated in the plot, which covers an approximate frequency range of 0.1 Hz to about 20 Hz for the model of FIG. 6a. In general, taking into account signal magnitude and noise floor, a preferred frequency range would be on the order of 0.1–1.0 Hz for typical sediment conductivities and reservoir depths. (A more thorough discussion of sensitivity is provided by Flosadóttir and Constable ("Marine controlled source electromagnetic sounding 1. Modeling and experimental design", *J. Geophys. Res.*, 101, pp. 5507–5517, 1996), which is incorporated herein by reference.)

Any combination of range and frequency that produces a factor of 10 or greater change in electric fields will be useful for the proposed method. Smaller changes may also be useful if other variations in environmental resistivity are not a problem.

Figure 7:
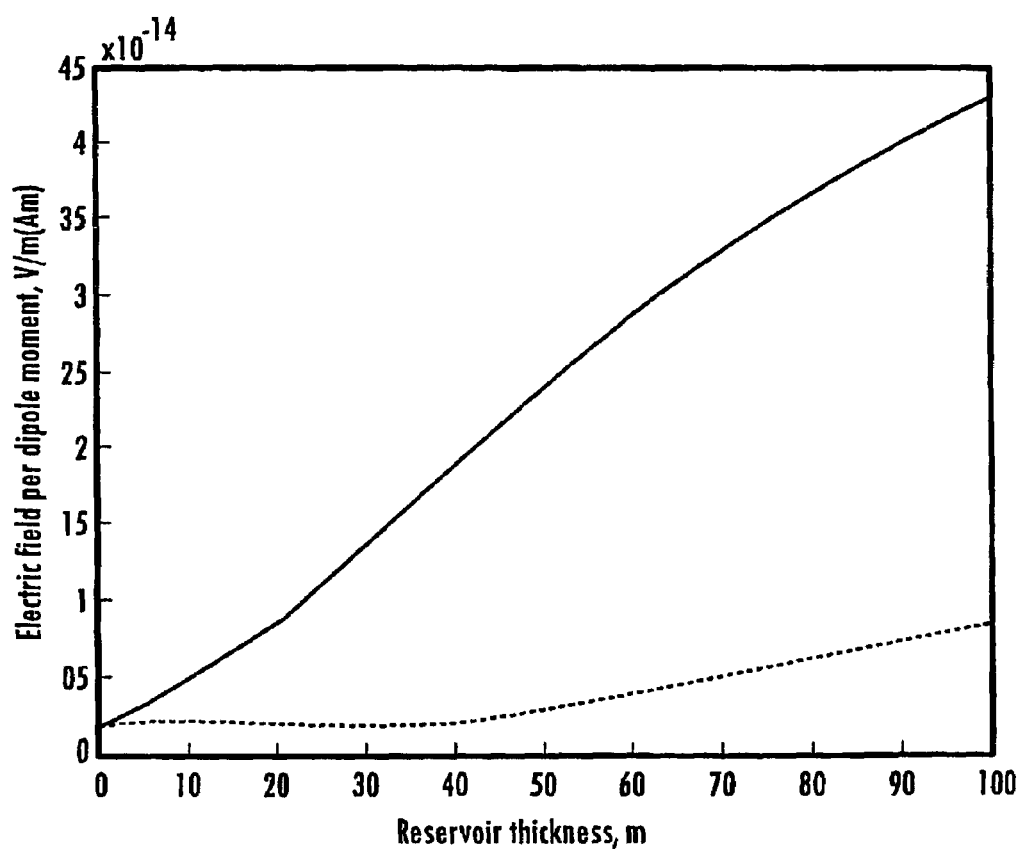
FIG. 7 is a plot showing the change in electric field per dipole moment with reservoir thickness.

The effect of depleting the reservoir on the measured electric fields can be predicted/modeled. With reference to the example shown in FIG. 7, for a range of 4.6 km and a transmission frequency of 1 Hz, the radial horizontal electric field is plotted versus reservoir thickness. As indicated, the electric field varies almost linearly with reservoir volume, and so a 1% resolution in electric field corresponds to a 1% resolution in reservoir thickness.

A change in sediment resistivity would also create a change in the radial electric field. However, it is unlikely that sediment resistivity would change enough to produce an order of magnitude change in the electric field. Furthermore, a change in overburden resistivity would also produce a change in azimuthal horizontal electric field, shown as a broken line in FIG. 7. It can be seen that the azimuthal electric field is much less sensitive to reservoir volume.

The method for monitoring a sub-seafloor hydrocarbon reservoir comprises locating an array of receiver antennae on the seafloor to cover an area corresponding to the location and dimensions of the sub-seafloor hydrocarbon reservoir. The receiver array can be permanently fixed or can be removably deployed using a plurality of data logger units or receiver antenna attached to permanent anchors. An electromagnetic field transmitter is positioned at or near the seafloor above the reservoir using either a fixed installation on a platform or a ship, which tows the transmitter. The platform may be above the water or on the seafloor The transmitter is activated to generate a first electromagnetic field which is detected using one or more antenna within the receiver array. The entire reservoir can be tested by sequential activation of multiple transmitters, which can be used to generate vertical fields, radial fields or azimuthal fields. The detected signals correspond to the first electromagnetic field subjected to the reservoir resistivity at the position corresponding to the location of the receiving antenna. The signal generated by the receiving antenna is amplified and data corresponding to the signal is logged using a data logging processor. The data logging processor is synchronized for signal stacking and phase measurement. The logged data is processed for real-time monitoring of electromagnetic parameters on the sub-seafloor, wherein the electromagnetic parameters correspond to changes in reservoir resistivity for determination of one or more of lateral extent, uniformity and depth of the reservoir. Multiple processors may be used and the data combined for measurement over large areas. The method for monitoring a hydrocarbon reservoir may be used during extraction and production to evaluate rate of extraction.

Other embodiments and modifications of the present invention will occur readily to those of ordinary skill in the art in view of these teachings. Therefore, this invention is to be limited only by the following claims which include all such other embodiments and modifications when viewed in conjunction with the above specification and accompanying drawings.

Additional References (Incorporated Herein by Reference.)

1. Chave, A. D., S. C. Constable, and R. N. Edwards, 1991: Electrical exploration methods for the seafloor, in Electromagnetic Methods in Applied Geophysics, Volume 2, M. Nabighian (ed), *Soc. Explor. Geophys.*, Tulsa., pp. 931–966.
2. MacGregor, L., M. Sinha, and S. Constable, 2001: Electrical resistivity structure of the Valu Fa Ridge, Lau Basin, from marine controlled-source electromagnetic sounding, *Geophys. J. Int.*, 146, pp 217–236.
3. Eidsmo, T., S. Ellingsrud, L. M. MacGregor, S. Constable, M. C. Sinha, S. Johansen, F. N. Kong, and H. Westerdahl, 2002: Sea bed logging (SBL), a new method for remote and direct identification of hydrocarbon filled layers in deepwater areas, *First Break*, 20, 144–152.
4. Ellingsrud, S., T. Eidsmo, S. Johansen, M. C. Sinha, L. M. MacGregor, and S. Constable, 2002: Remote sensing of hydrocarbon layers by seabed logging (SBL): Results from a cruise offshore Angola, *The Leading Edge*, 21, 972–982.
5. Cox, C. S., S. C. Constable, A. D. Chave and S. C. Webb, 1986: Controlled-source electromagnetic sounding of the oceanic lithosphere, *Nature*, 320:6057, 52–54.
6. Sinha, M. C., P. D. Patel, M. J. Unsworth, T. R. E. Owen and M. R. G. MacCormack, 1990: An Active Source Electromagnetic Sounding System for Marine Use, *Marine Geophys. Res.*, 12, 59–68.

What is claimed is:

1. A system for real-time monitoring of changes in a sub-seafloor hydrocarbon reservoir over an interval of time during which there may be hydrocarbon extraction, comprising:
a controlled source electromagnetic transmitter comprising at least one transmitting antenna for transmitting electromagnetic energy on a plurality occasions over the interval;
a plurality of seafloor antennae distributed on the seafloor over an area corresponding to the reservoir, wherein each seafloor antenna comprises a receiver electrode array, each providing a signal responsive to energy from the transmitter on each of the occasions;
at least one data logging processor for receiving on each occasion the signal from each of the antennae, the signal characterizing, in part, impedance of the reservoir, and for causing storage, for each occasion, of at least one parameter related to the signals received from the antennae;
a clocking device for associating a time with respect to the at least one parameter stored; and
an optional comparison process for identifying changes over time in the at least one parameter.

2. The system of claim 1, wherein the at least one transmitting antenna transmits electromagnetic energy at a frequency selected to produce a ten-fold or greater change in field strength as the reservoir is depleted.

3. The system of claim 2, wherein the frequency falls within a range of 0.1 Hz to 1.0 Hz.

4. The system of claim 2, wherein a range between the at least one transmitting antenna and one of the plurality of seafloor antennae is selected in combination with the frequency.

5. The system of claim 1, wherein each seafloor antenna comprises a plurality of electrodes disposed at pre-determined distances along a conductive cable.

6. The system of claim 1, wherein the plurality of seafloor antennae is installed in a fixed array on the seafloor.

7. The system of claim 1, wherein the plurality of seafloor antennae comprises a plurality of receivers removably deployed on the seafloor.

8. The system of claim 1, wherein the electromagnetic transmitter is fixed in place relative to the reservoir and the plurality of seafloor antennae.

9. The system of claim 8, wherein the electromagnetic transmitter is mounted on a platform constructed for hydrocarbon extraction from the reservoir.

10. The system of claim 9, wherein the platform is disposed above water.

11. The system of claim 9, wherein the platform is disposed on the seafloor, and wherein the electromagnetic transmitter is enclosed in a water- and pressure-resistant housing.

12. The system of claim 1, wherein the electromagnetic transmitter is towed by a ship over an area corresponding to the reservoir.

13. The system of claim 12, wherein the electromagnetic transmitter is towed by a neutrally buoyant cable comprising a conductor encased in a thermoplastic elastomer having a density less than 1000 kg/m$^3$.

14. The system of claim 1, wherein the electromagnetic energy includes a vertical field and each of the plurality of seafloor antennae provides a signal responsive to the vertical field.

15. The system of claim 1, wherein the electromagnetic energy includes a radial field and the receiver electrode array includes receiver electrode pairs disposed in a radial orientation across the reservoir that measure the radial field and provide a signal responsive to the radial field.

16. The system of claim 1, wherein the electromagnetic energy includes an azimuthal field and the receiver electrode array includes a pair of receiver electrodes corresponding to a line or arc between a pair of radii that detects the azimuthal field and provides a signal responsive to the azimuthal field.

17. The system of claim 1, further comprising:
magnetic field induction sensors for performing a magnetotelluric survey for generating a signal for correction of data obtained from the plurality of seafloor antenna.

18. A method for real-time monitoring of changes in a sub-seafloor hydrocarbon reservoir over an interval of time during extraction comprising:
(a) distributing a plurality of receiver antennae on the seafloor over an area corresponding to the reservoir, wherein each antenna comprises a receiver electrode array;
(b) deploying at least one electromagnetic field transmitter at or near the seafloor above the reservoir;
(c) obtaining, on a plurality of occasions during the interval, from each of the receiver antennae, a signal responsive to energy from the transmitter, each signal characterizing in part impedance of the reservoir;
(d) storing, for each occasion, at least one parameter related to signals received from the antennae; and
(e) identifying changes over time in the at least one parameter.

19. The method system of claim 18, wherein the transmitter emits energy at a frequency selected to produce a ten-fold or greater change in field strength of the obtained signal as the reservoir is depleted.

20. The method of claim 19, wherein the frequency falls within a range of 0.1 Hz to 1.0 Hz.

21. The method of claim 19, wherein a range between the transmitter and one of the plurality of receiver antennae is selected in combination with the frequency.

22. The method of claim 18, wherein each receiver antenna comprises a plurality of electrodes disposed at pre-determined distances along a conductive cable.

23. The method of claim 18, wherein the plurality of receiver antennae is installed in a fixed array on the seafloor.

24. The method of claim 18, wherein the plurality of receiver antennae comprises a plurality of receivers removably deployed on the seafloor.

25. The method of claim 18, wherein the electromagnetic field transmitter is fixed in place relative to the reservoir and the plurality of receiver antennae.

26. The method of claim 25, further comprising mounting the electromagnetic field transmitter on a platform constructed for hydrocarbon extraction from the reservoir.

27. The method of claim 18, further comprising deploying and towing the electromagnetic field transmitter over an area corresponding to the reservoir using a ship.

28. The method of claim 27, wherein the electromagnetic field transmitter is towed by a neutrally buoyant cable comprising a conductor encased in a thermoplastic elastomer having a density less than 1000 kg/m$^3$.

29. The method of claim 18, further comprising:
performing a magnetotelluric survey; and
applying measurements from the magnetotelluric survey for correction of the at least one stored parameter.

* * * * *